Nov. 25, 1941.　　　V. H. HARDY ET AL　　　2,263,988
THERMOSTAT
Filed June 5, 1939　　　2 Sheets-Sheet 1

Inventors
Vaughn H. Hardy &
Cyril T. Wallis
Blackmore, Spencer & Flint
Attorneys

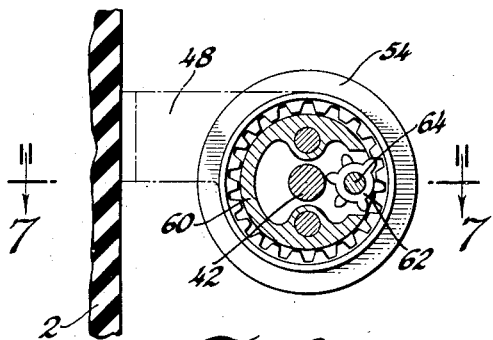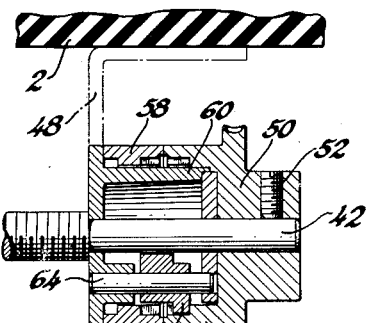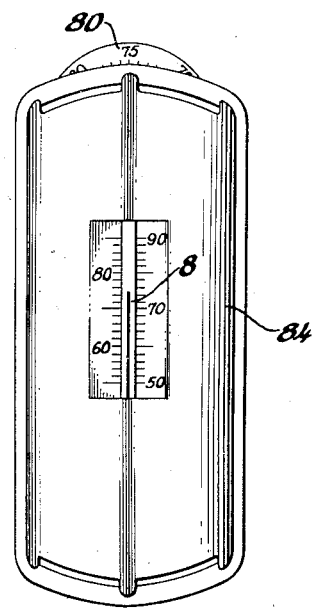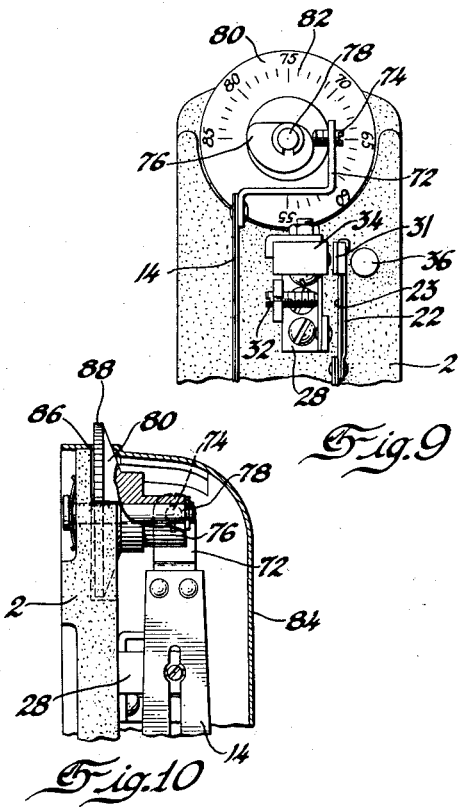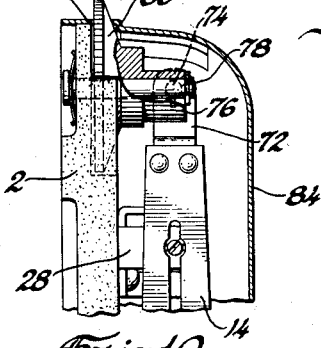

Patented Nov. 25, 1941

2,263,988

UNITED STATES PATENT OFFICE 2,263,988

THERMOSTAT

Vaughn H. Hardy and Cyril T. Wallis, Rochester, N. Y., assignors to General Motors Corporation, Detroit, Mich., a corporation of Delaware Application June 5, 1939, Serial No. 277,440

5 Claims. (Cl. 200—139)

This invention relates to regulators and more specifically to regulators responsive to thermal changes in the ambient temperature.

With the increased use of automatic sources of heat within enclosures and particularly in domestic residences, it is necessary to provide control means for said automatic heating plants which are easily adjusted and of pleasing appearance and simple construction.

It is therefore an object of our invention to provide a thermostat suitable for the above installations. With this and other objects in view our invention will be better understood by reference to the following specification and claims and the illustrations in the accompanying drawings, in which:

Figure 6 is an enlarged sectional view taken on line 6—6 of Figure 2;

Figure 7 is a sectional view taken on line 7—7 of Figure 6;

Figure 8 is an elevation showing a modified form of our invention;

Figure 9 is a view similar to Figure 8 of a portion of the thermostat with the case removed; and, Figure 10 is a side view of the upper portion of the modified form shown in Figure 8, parts being shown in section.

Figure 1:
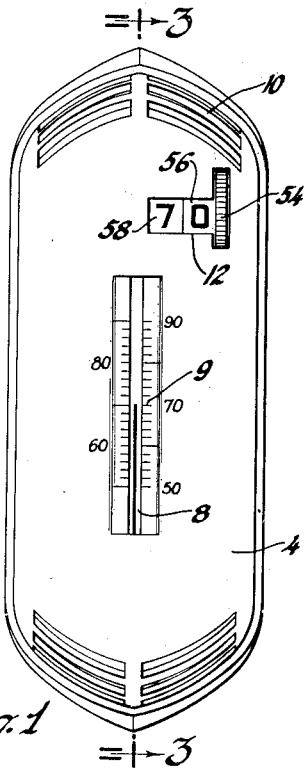
Figure 1 is a front elevation of a thermostat embodying our invention.
Figure 2:
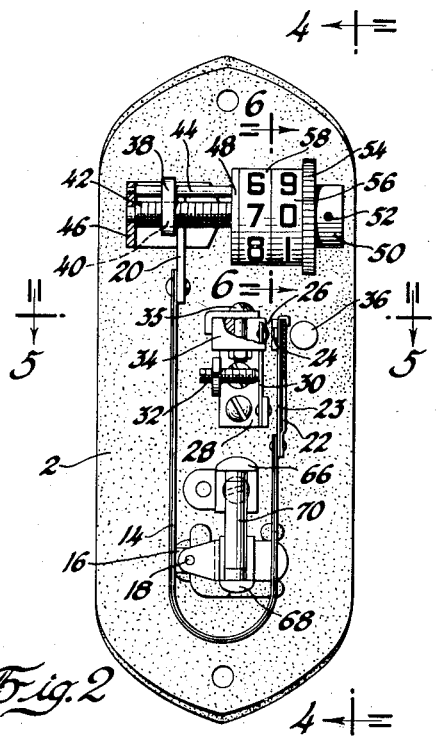
Figure 2 is a view similar to Figure 1 with the case removed.
Figure 3:
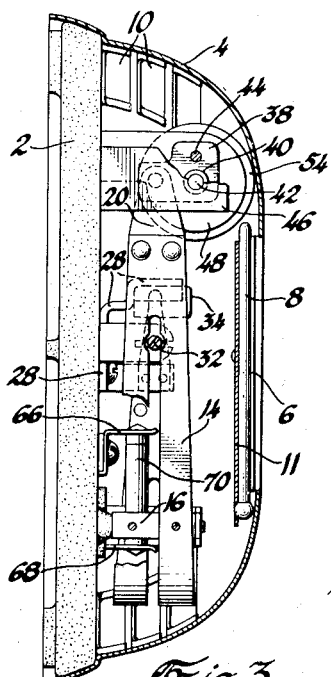
Figure 3 is a section taken on line 3—3 of Figure 1.

Referring now more specifically to the form shown in Figures 1–7, there is provided a base 2 formed of insulating material over which is mounted a suitable cover 4 providing a space between the cover and base for the desired regulating apparatus. In the center of the cover 4 there is a depressed portion and slot 6 within which is supported a thermometer 8, the same being held against the casing by a bracket 11 suitably secured to the case. There is also provided on the casing adjacent this longitudinally depressed portion scale means 9 for cooperation with the variable liquid level in the thermometer. In the two opposite ends of the casing 4 there are provided a series of louvers 10 so that air may circulate freely through the casing. There is also provided an opening 12 adjacent the upper end, as shown in Figure 1, through which certain numbers are visible to indicate the setting and also provides access to an adjusting member, the details of which will later be described.

Since the present device is a temperature regulating means, there is provided means within the casing whose shape varies due to changes in temperature, this member being a bimetal strip 14 formed of any two dissimilar metals, the difference in characteristics of which are dependent upon the desired sensitivity of the switching means. This element is, as shown here, formed roughly of U-shape and carries at one side a small U-shaped bracket 16 which is pivoted upon the pin 18 carried in the base 2. The two ends of the bimetal U-shaped member are more or less free to move, one end carrying an arm 20 whose position may be adjusted. The opposite end also carries an arm 22 upon which is mounted a spring arm 23 and a switch contact 24 for cooperation with a second switch contact 26 mounted on a flexible arm 30 carried by a bracket 28 on the base. The bracket 28 also carries an adjustable screw 32 which bears against the flexible arm 30 so that the position of the contact 26 carried thereby may be adjusted.

Figures 4, 5:
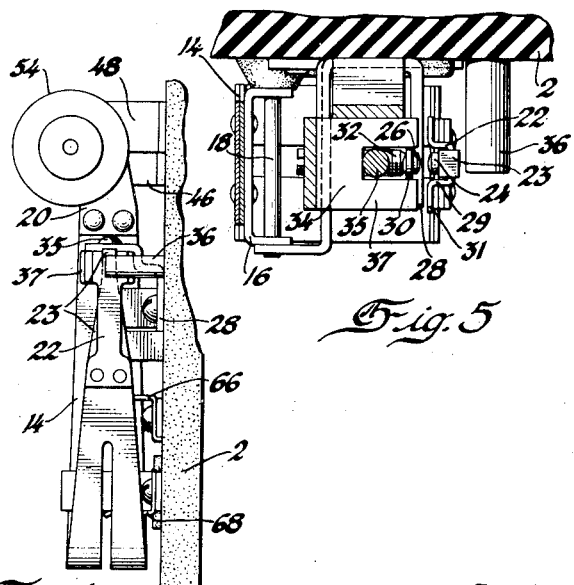
Figure 4 is a view taken on line 4—4 of Figure 2 with parts broken away.
Figure 5 is a section taken on line 5—5 of Figure 2 enlarged to better show the invention.

There is carried by the bracket 28 a small permanent magnet 34 through bolt 35 which projects between the two magnetic poles 37, the poles 37 substantially surrounding the adjustable contact 26 as best shown in Figure 5. The magnetic poles 37 are adapted to attract the supporting means for the contact 24, being formed at the top with an indentation 29 within which the actual contact member 24 is seated, the face of the bracket as at 31 being adapted to lie substantially adjacent the pole faces 37 and thus causing snap action of the two contacts into engagement or to maintain the two in contact until the movable contact snaps away causing rapid engagement and disengagement of the two contacts to prevent burning thereof due to arcing.

There is also provided a pin stop 36 at the opposite side of the movable contact 24 to prevent the same moving too far from its ordinary normal position. The lever 20 secured to the other arm of the bimetal adjuster 14 is rigidly secured to a block 38, said block having a pair of openings therethrough, one of which is internally threaded as at 40 and through which passes a threaded rotatable shaft 42 and the other of which is adapted to slide upon a guide pin 44. Both the threaded shaft and the guide pin have one end journaled in a bracket 46 secured to the base 2 and are also journaled in a spaced bracket 48 for further support. Thus as the shaft 42 is rotated the block 38 will move axially thereof, its speed being dependent on the pitch of the screw so that the end of the bimetal member 14 may be moved back and forth depending on the desired adjustment.

The means for rotating this threaded shaft 42 are best shown in detail in Figures 6 and 7 and resemble substantially what is known as odometer wheels. The portion of the shaft 42 which extends through the bracket 48 is not threaded and has secured on its extreme end thereof an annular member 50 having a plurality of different diameters. This is secured to the shaft by set screw 52 and has a relatively large diameter at 54 which is knurled to provide a manual engaging portion for adjustment. It then has a slightly smaller diameter as at 56 upon which numerals from 0 to 9 are imprinted for indication of the various adjustments. Mounted adjacent this number wheel there is a second number wheel 58 carrying also the same numerals, both being adapted to rotate upon a flange 60 extending from the supporting bracket 48. A transfer pinion 62 is rotatably supported upon a pin 64 carried by the bracket 49 for transferring the rotation of the outer number wheel 56 to the inner number wheel 58 so that upon one complete revolution of the wheel 56 one numeral will be moved upon the wheel 58.

The opening 12 in the casing is designed to come opposite these two number wheels and also to provide sufficient space for the knurled portion 54 to extend through the casing where it may be manually engaged and set to any desired position. Thus as the number wheels are rotated the shaft 42 will move one end of the bimetal member 14 to alter the position of the contact 24 with respect to the contact 26 and by proper design and adjustment a given temperature, as indicated on the odometer wheels, will be provided in the space within which the thermostat is mounted.

In order to provide a more even adjustment of temperature in instances where automatic heat is provided it has been found advantageous to provide a small heating element in proximity to the temperature controlling elements such as the bimetal member 14 which heating element is energized when the controlling switch, such as 24, 26, is closed. In this manner the element 14 will be heated faster than ordinarily or without the small heating element and will cause the contacts 24, 26 to open at a slightly earlier time. This prevents the source of heating from proceeding to a higher point than desired or what is ordinarily known as over-shooting. In the present instance therefore we provide a plurality of spaced spring clips such as 66, 68 which are supported upon the base 2 and between which there is adapted to be supported a small resistor heater such as 70. This assembly is desirable due to the ease of replacement in case the resistor heater is burned out.

The modification of our invention shown in Figures 8–10 applies only to the means of adjustment of the upper end of the bimetal strip 14, the other portions of the thermostat being exactly the same as that shown in the earlier form. In this case there is secured to the adjustable end of the bimetal member 14 a Z-shaped arm 72 which is riveted therethrough and which carries at its upper extremity a small adjustable set screw 74, the end of which is adapted to engage a cam surface 76 carried on a shaft 78 normal to the surface of the base 2. Also carried upon this shaft is a larger wheel 80 having a graduated scale 82 adjacent its periphery. Of course in this instance the outer casing 84 will have to be of different form and in this instance is provided with a slot 86 through which a portion of the rotatable wheel 80 may project and through which the scale 82 will be visible so that the setting may be indicated. The periphery of the wheel 80 is, as before, knurled as at 88 to assist in the manual adjustment. Thus as the wheel 80 is manually turned the cam surface 76 will force the end of the adjusting screw 74 back and forth which force is transmitted through the arm 72 to the bimetal member 14 for the desired adjustment.

We claim:

1. In a thermostat, a thermostatic member provided with a movable arm having laterally extending ears at one extremity, a spring lever carried by said arm, the end of which lies between the ears, a contact carried by the end of the spring lever, a stationary U-shaped magnet, a second spring lever parallel to the first with one end thereof positioned between the magnet poles and a second contact mounted upon said end to cooperate with the first contact and whereby the magnet will attract the ears of the arm to cause snap action of the switch contacts which are thus enclosed, and means engaging said second spring lever to adjust said second contact relatively to said first contact.

2. In a thermostat, a base, a bimetal member pivotally connected to the base, a pair of parallel members secured to the end of the bimetal member, a contact carried by one of the last-mentioned members, the extremity of the other parallel member being so formed as to substantially surround the contact, a bracket carried by the base, a spring arm secured thereto, a second contact carried thereby to cooperate with the first contact to form a switch and magnetic means substantially encompassing the second contact and adjacent the surrounding portion of the second parallel member whereby the magnetic means will attract the member and cause the two contacts to snap closed.

3. In a thermostat, an adjustable member sensitive to variations in temperature, threaded means in engagement with said member for causing adjustment, a manually rotatable cylindrical wheel secured to the threaded means, a second cylindrical wheel mounted for rotation adjacent the first wheel, gearing interconnecting the two wheels and indicating indicia inscribed on the outer surface of each wheel whereby rotation of the first wheel will adjust the member and the indicia on the two wheels will indicate the setting.

4. In a thermostat, a base, a bimetal member pivotally mounted on said base, a movable contact carried by one end of the member, a stationary contact carried by the base to cooperate with the movable contact carried by the member, a rotatable screw carried by the base, an arm carried by the opposite end of the bimetal member and threadedly engaging said screw, a manually rotatable wheel secured to the screw for rotating the same, numerals carried by the wheel, a second rotatable wheel mounted adjacent the first, numerals also carried by the second wheel and means interconnecting the wheels whereby the first wheel may rotate the second and the numerals will indicate the setting of the bimetal member.

5. In a thermostat, a base, a bimetal member pivotally mounted on said base, a movable contact carried by said member, a relatively fixed contact carried by the base to cooperate with said movable contact, means to adjust said movable contact relative to said fixed contact including a rotatable shaft on said base having a threaded portion engaged by said bimetal member to move the same on rotation of said shaft, a wheel secured to said shaft, said wheel being provided with a knurled portion adapted to be manually engaged to rotate said shaft, a second wheel rotatably mounted on said shaft adjacent the first wheel, transfer mechanism between said wheels, and numerals on said wheels to indicate the temperature setting of said thermostat.

VAUGHN H. HARDY.
CYRIL T. WALLIS.